(12) United States Patent
Imafuku et al.

(10) Patent No.: US 9,500,238 B2
(45) Date of Patent: Nov. 22, 2016

(54) CLUTCH MECHANISM FOR VEHICLE

(71) Applicant: Toyota Jidosha Kabushiki Kaisha, Toyota-shi Aichi-ken (JP)

(72) Inventors: Mizuki Imafuku, Kariya (JP); Akinori Homan, Toyota (JP); Tomohiro Arakawa, Komaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/875,043

(22) Filed: Oct. 5, 2015

(65) Prior Publication Data
US 2016/0097430 A1    Apr. 7, 2016

(30) Foreign Application Priority Data
Oct. 7, 2014    (JP) ................. 2014-206780

(51) Int. Cl.
| | |
|---|---|
| F16D 25/0638 | (2006.01) |
| F16D 13/52 | (2006.01) |
| F16D 11/04 | (2006.01) |
| F16D 11/14 | (2006.01) |
| B60K 17/34 | (2006.01) |
| F16D 13/54 | (2006.01) |
| F16D 55/36 | (2006.01) |
| F16D 11/00 | (2006.01) |
| F16D 125/40 | (2012.01) |
| F16D 125/36 | (2012.01) |

(52) U.S. Cl.
CPC ........... *F16D 25/0638* (2013.01); *B60K 17/34* (2013.01); *F16D 11/04* (2013.01); *F16D 11/14* (2013.01); *F16D 13/52* (2013.01); *F16D 13/54* (2013.01); *F16D 55/36* (2013.01); *F16D 2011/004* (2013.01); *F16D 2125/36* (2013.01); *F16D 2125/40* (2013.01)

(58) Field of Classification Search
CPC .................. F16D 25/0638; F16D 13/54; F16D 11/02; F16D 11/04; F16D 11/14; F16D 2011/004; F16D 2125/34; F16D 2125/36; F16D 2125/40
See application file for complete search history.

(56) References Cited

FOREIGN PATENT DOCUMENTS

JP    2002-067722 A    3/2002

*Primary Examiner* — Jacob S Scott
(74) *Attorney, Agent, or Firm* — Dinsmore & Shohl LLP (57) ABSTRACT

A clutch mechanism includes a first and a second rotating members, a clutch hub, a clutch drum, a plurality of friction engagement elements, a piston, a piston driving device and a sleeve. A clutch hub main body of the clutch hub is connected to the first rotating member and does not rotate relative to the first rotating member. An inner hub of the clutch hub rotates relative to the clutch hub main body. The inner hub engages with an inner peripheral side of the friction engagement elements and does not rotate relative to the friction engagement elements. The sleeve does not rotate relative to the inner hub. The sleeve moves relative to the first rotating member. The sleeve moves in conjunction with the piston to a position where the sleeve engages with the clutch hub main body and does not rotate relative to the clutch hub main body.

7 Claims, 4 Drawing Sheets

CLUTCH MECHANISM FOR VEHICLE

INCORPORATION BY REFERENCE

The disclosure of Japanese Patent Application No. 2014-206780 filed on Oct. 7, 2014 including the specification, drawings and abstract is incorporated herein by reference in its entirety.

BACKGROUND OF THE INVENTION

1. Field of the Invention

The invention relates to a clutch mechanism for a vehicle.

2. Description of Related Art

Japanese Patent Application Publication No. 2002-067722 (JP 2002-067722 A) describes a clutch mechanism that allows and interrupts the transmission of power by connecting or disconnecting a first rotating member to or from a second rotating member, both of which are provided in a power transmitting path and rotate relative to one another. The clutch mechanism described in JP 2002-067722 A is a first mesh clutch provided inside a transfer device. This kind of clutch is characterized in that a relatively large transfer capacity is able to be obtained by mesh teeth of the first rotating member (a 2-4 sleeve) provided in a manner non-rotatable with respect to a main shaft and movable in an axial direction, and mesh teeth provided on the second rotating shaft (an input side sprocket) being connected and disconnected (i.e., placed in and out of mesh) by the first rotating member being moved by a shift fork to a disengaged (non-meshing) position and an engaged (meshing) position.

SUMMARY OF THE INVENTION

The first mesh clutch described above switches from a 2WD driving state to a 4WD driving state by being placed in an engaged state. The first mesh clutch does not have a rotation synchronizing mechanism. Therefore, when an attempt is made to switch from the 2WD driving state to the 4WD driving state while running, the meshing teeth may rattle (i.e., gear rattle), wear, or break, so switching from the 2WD driving state to the 4WD driving state while running is difficult.

In contrast, when the first mesh clutch described above is provided with a rotation synchronizing mechanism for increasing the rotation speed from a non-rotating (i.e., stopped) state to synchronous rotation, the clutch mechanism becomes complex, and the size of the clutch mechanism increases.

The invention thus provides a clutch mechanism for a vehicle that is small in size and in which drag torque when power is interrupted is small.

One aspect of the invention relates to a clutch mechanism for a vehicle. The clutch mechanism includes a first rotating member, a second rotating member, a clutch hub, a clutch drum, a plurality of friction engagement elements, a piston, a piston driving device and a sleeve. The first rotating member has a shaft shape. The second rotating member is supported by the first rotating member such that the second rotating member rotates relative to the first rotating member. The clutch hub is connected to the first rotating member such that the clutch hub does not rotate relative to the first rotating member. The clutch drum is connected to the second rotating member. The plurality of friction engagement elements is configured to alternately engage with the clutch hub and the clutch drum. The plurality of friction engagement elements is configured to engage with the clutch hub such that the plurality of friction engagement elements does not rotate relative to the clutch hub when the plurality of friction engagement elements engages with the clutch hub. The plurality of friction engagement elements is configured to engage with the clutch drum such that the plurality of friction engagement elements does not rotate relative to the clutch drum when the plurality of friction engagement elements engages with the clutch drum. The plurality of friction engagement elements is overlapped with each other and configured to frictionally engage together. The piston is configured to press on the plurality of friction engagement elements. The piston driving device is configured to drive the piston. The piston driving device is configured to press the piston against the plurality of friction engagement elements such that the first rotating element and the second rotating element become selectively connected together by friction between the plurality of friction engagement elements. The clutch hub includes a clutch hub main body and an inner hub. The clutch hub main body is connected to the first rotating member such that the clutch hub main body does not rotate relative to the first rotating member. The inner hub is configured to rotate relative to the clutch hub main body. The inner hub engages with an inner peripheral side of the friction engagement elements such that the inner hub does not rotate relative to the friction engagement elements. The sleeve is configured to not rotate relative to the inner hub. The sleeve is configured to move relative to the first rotating member in a rotational axis direction of the first rotating member. The sleeve is configured to move in conjunction with the piston to a position where the sleeve engages with the clutch hub main body and does not rotate relative to the clutch hub main body.

According to this structure, when the piston is not being operated, the clutch hub main body of the clutch hub rotates with the first rotating member, and the inner hub, the friction engagement elements, the clutch drum, and the second rotating member are in non-rotating states. The plurality of friction engagement elements at this time do not rotate relative to each other, so drag torque is considerably small. When the piston is operated, relative rotation of the plurality of friction engagement elements decreases, but the sleeve and the clutch hub main body remain disengaged until the sleeve is rotating at the same speed as the clutch hub main body. Once the sleeve reaches the speed at which it is rotating in synchronization with the clutch hub main body, the sleeve and the clutch hub main body spline are engaged such that power is able to be transmitted.

According to the structure described above, when the piston is released, i.e., in a non-operating state, the drag torque becomes considerably small. With this structure, the adjusting function of the transfer torque and speed synchronization are able to be performed with the single piston driving device, so the size of the clutch mechanism is able to be smaller.

The clutch mechanism may further includes first spline teeth, second spline teeth and third spline teeth. The first spline teeth may be parallel to the rotational axis direction. The first spline teeth may be provided pointing inward on the clothe hub main body. The second spline teeth may be adjacent to the first spline teeth. The second spline teeth may have the same diameter as the first spline teeth. The second spline teeth may be provided pointing inward on the inner hub. The third spline teeth may engage with the second spline teeth. The third spline teeth may be provided pointing outward on the sleeve. End portions of the third spline teeth may move between an engaged position in which the end portions of the third spline teeth are in mesh with the first spline teeth and a disengaged position in which the end portions of the third spline teeth are separated from the first spline teeth. According to this structure, the size of the clutch mechanism becomes even smaller.

The clutch mechanism may further includes an elastic member. The elastic member may be interposed between the sleeve and the piston. The elastic member may be configured to temporarily stop the sleeve when the piston is moved toward the engaged position. According to this structure, if the mesh phases between the sleeve and the clutch hub main body do not match, the sleeve is allowed to stop by the deformation of the elastic member. Then when the meshing phases between the sleeve and the clutch hub main body match, the sleeve is able to be moved by the elastic restoring force of the elastic member. As a result, the problems of gear rattle and teeth breaking are able to be eliminated.

In the clutch mechanism, the piston driving device may include a threaded member, a nut member, and an electric motor. The threaded member may be supported by the first rotating member. The threaded member and the first rotating member may be configured to rotate relative to one another. A thread groove may be provided on an outer peripheral surface of the threaded member. The nut member may be screwed onto the threaded member. The nut member may apply thrust to the piston. The electric motor may be configured to rotatably drive the threaded member via a reduction gear. According to this structure, engagement and release of the clutch mechanism are controlled by the electric motor, so the driving device is able to be smaller.

In the clutch mechanism, the reduction gear may include a worm wheel and a worm reduction gear. The worm wheel may be concentrically fixed to the threaded member. The worm reduction gear may mesh with outer peripheral teeth of the worm wheel. The worm reduction gear may be rotatably driven by the electric motor. According to this structure, the worm reduction gear has a large reduction gear ratio, so a brake mechanism for keeping the electric motor stopped is not necessary.

In the clutch mechanism, the piston driving device may include a first cam plate, a second cam plate, and a stopper. The first cam plate may be supported by the first rotating member such that the first cam plate rotates relative to the first rotating member. The first cam plate may include a first surface. The first surface may have a first cam groove into which a portion of a ball fits. The second cam plate may be supported by the first rotating member such that the second cam plate does not rotate relative to the first rotating member. The second cam plate may include a second surface. The second surface may have a second cam groove into which another portion of the ball fits. The first cam plate and the second cam plate may be interposed between the piston and the stopper while sandwiching the ball. The electromagnetic friction brake may be provided between the first cam plate and a non-rotating member, and a distance between the first cam plate and the second cam plate increases such that thrust is applied to the piston, when braking torque by the friction brake is applied to the first cam plate. According to this structure, thrust is applied to the piston using the rotary force of the first rotating member, so large thrust is able to be obtained with the relatively small amount of energy that it takes to energize the electromagnetic coil of the electromagnetic friction brake.

In the clutch mechanism, the piston driving device may include a hydraulic chamber and a hydraulic cylinder. The hydraulic cylinder may be fitted into an opening in the hydraulic chamber such that the hydraulic cylinder slides against an inner peripheral wall of the opening. The hydraulic cylinder may include a hydraulic piston that is pushed out by hydraulic pressure inside the hydraulic chamber. According to this structure, in a vehicle provided with a hydraulic pump and a valve body within which a hydraulic circuit is formed, relatively large thrust is able to be obtained by supplying hydraulic fluid to a hydraulic pressure chamber using the hydraulic pump and valve body.

Also, preferably, the vehicle is a four-wheel-drive vehicle that is provided with a transfer that constantly transmits power output from a driving source to main driving wheels, and transmits some of the power to auxiliary driving wheels by operation of the clutch mechanism. The first rotating member that has a shaft shape is designed to constantly transmit power output from the driving source to the main driving wheels. The second rotating member is a driving side sprocket around which is wound a drive belt that is also wound around a driven side sprocket that is fixed to an output shaft to the auxiliary driving wheels. This second rotating member, i.e., the driving side sprocket, is provided so as to be able to rotate around a rotational axis that is parallel to the rotational axis of the first rotating member. According to this structure, the clutch mechanism is able to distribute power to the auxiliary driving wheels when the four-wheel-drive vehicle is in four wheel drive.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described in detail with reference to the accompanying drawings.

Figure 1:
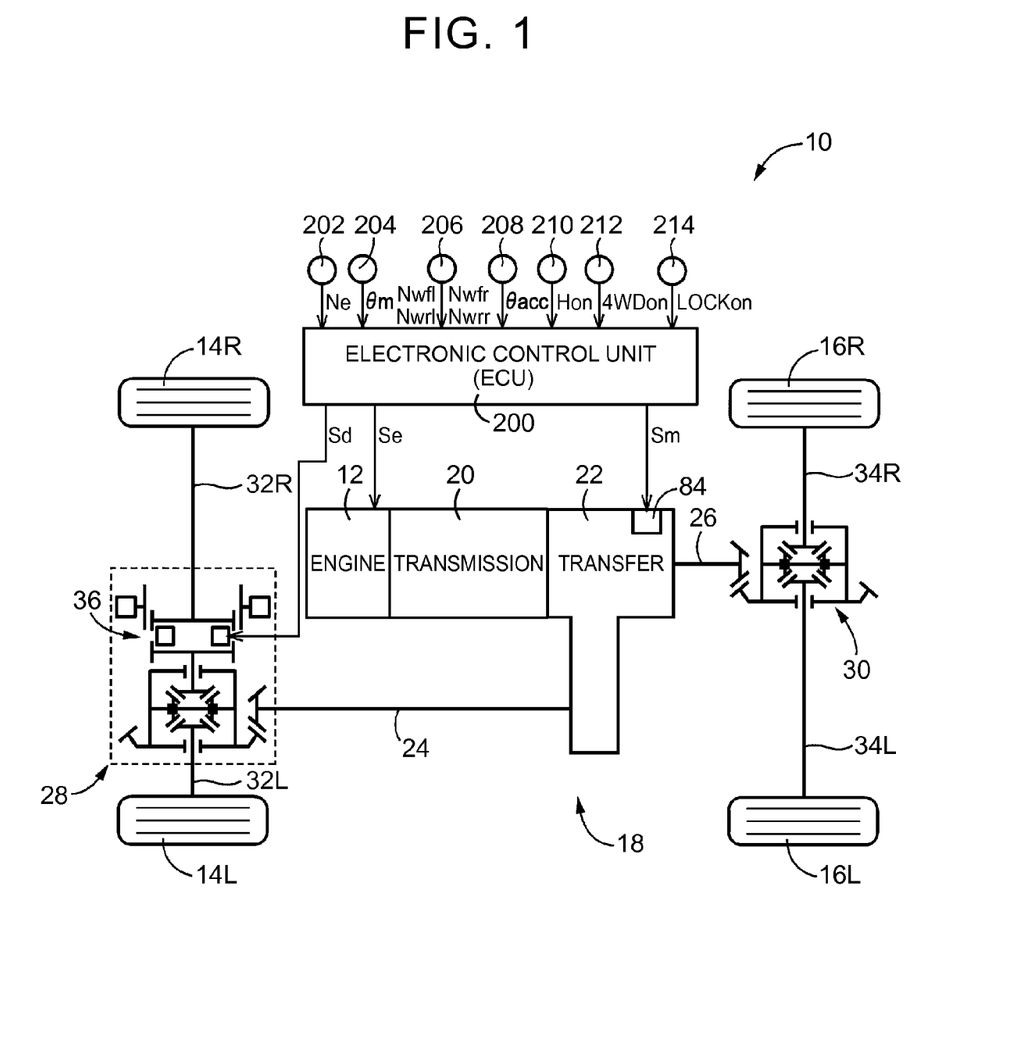
FIG. 1 is a view schematically showing the structure of a four-wheel-drive vehicle to which a clutch mechanism according to one example embodiment of the invention may be applied, and shows the main portions of a control system of various controls in the vehicle.

FIG. 1 is a view schematically showing the structure of a four-wheel-drive (4WD) vehicle 10 to which one example embodiment of the invention may be applied, and shows the main portions of a control system of various controls in the vehicle 10. As shown in FIG. 1, the vehicle 10 includes an engine 12 as a driving force source, left and right front wheels 14L and 14R (simply referred to as "front wheels 14" unless otherwise specified), left and right rear wheels 16L and 16R (simply referred to as "rear wheels 16" unless otherwise specified), and a power transmitting apparatus 18 that transmits power from the engine 12 to the front wheels 14 and the rear wheels 16, and the like. The rear wheels 16 are main driving wheels that are driving wheels both when running in two-wheel-drive (2WD) and in four-wheel-drive (4WD). The front wheels 14 are auxiliary driving wheels that are driven wheels when running in 2WD and are driving wheels when running in 4WD. Therefore, the vehicle 10 is a front engine rear wheel drive (FR)-based four-wheel-drive vehicle.

The power transmitting apparatus 18 includes a transmission 20 that is connected to the engine 12, a vehicle transfer 22 (hereinafter, simply referred to as "transfer 22") that is a front-rear wheel power transfer that is connected to the transmission 20, a front propeller shaft 24 and a rear propeller shaft 26 that are each connected to the transfer 22, a front wheel differential gear unit 28 that is connected to the front propeller shaft 24, a rear wheel differential unit 30 that is connected to the rear propeller shaft 26, left and right front wheel axles 32L and 32R (simply referred to as "front wheel axles 32" unless otherwise specified) that are connected to the front wheel differential gear unit 28, and left and right rear wheel axles 34L and 34R (simply referred to as "rear wheel axles 34" unless otherwise specified) that are connected to the rear wheel differential unit 30, and the like. In the power transmitting apparatus 18 structured in this way, power from the engine 12 that has been transmitted to the transfer 22 via the transmission 20 is then transmitted from the transfer 22 to the rear wheels 16 via a power transmitting path on the rear wheel side that includes the rear propeller shaft 26, the rear wheel differential unit 30, and the rear wheel axles 34 and the like in this order. Some of the power from the engine 12 that is to be transmitted to the rear wheel 16 side is distributed to the front wheel 14 side by the transfer 22, and then transmitted to the front wheels 14 via a power transmitting path on the front wheel side that includes the front propeller shaft 24, the front wheel differential gear unit 28, and the front wheel axles 32 and the like in this order.

The front wheel differential gear unit 28 includes a front-side clutch 36 on the front wheel axle 32R side (i.e., between the front wheel differential gear unit 28 and the front wheel 14R). The front-side clutch 36 is a dog clutch (i.e., a mesh-type clutch) that is electrically (electromagnetically) controlled and selectively establishes or interrupts the power transmitting path between the front wheel differential gear unit 28 and the front wheel 14R. The front-side clutch 36 may also be provided with a synchronizing mechanism.

Figure 2:
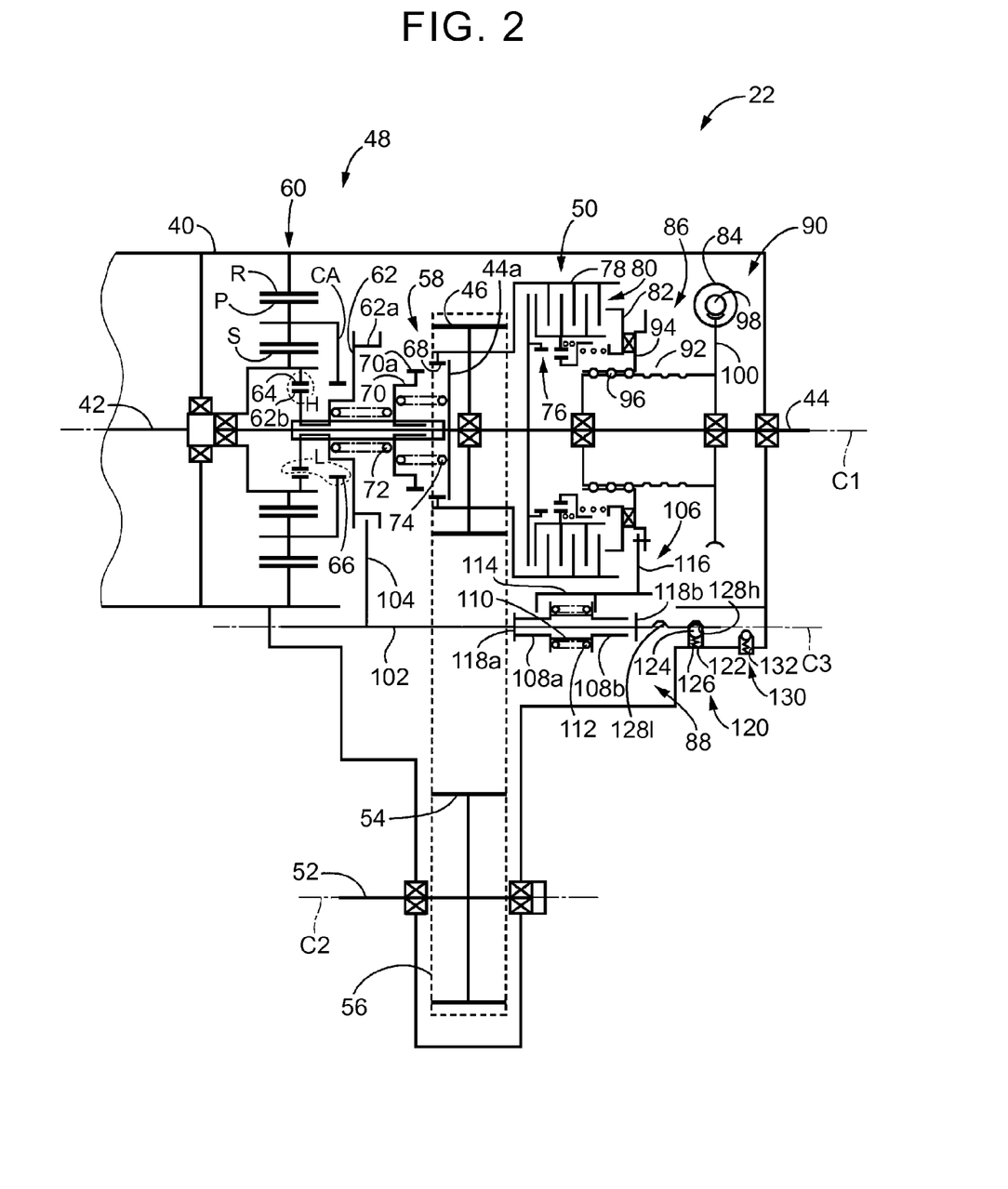
FIG. 2 is a skeleton view schematically showing the structure of a transfer provided in the four-wheel-drive vehicle shown in FIG. 1, and illustrates the manner for switching to a 2WD running state in a center differential locked state in a high-speed side gear.

FIG. 2 is a skeleton view of the general structure of the transfer 22. In FIG. 2, the transfer 22 includes a transfer case 40 (one example of a non-rotating member). The transfer 22 includes, inside the transfer case 40 and all on a common axial center C1, an input shaft 42, a rear-wheel side output shaft 44 (one example of a first output rotating member) that outputs power to the rear wheels 16 (one example of first left and right wheels), a driving side sprocket 46 (one example of a second rotating member) that outputs power to the front wheels 14 (one example of a second left and right wheels), a high-low switching mechanism 48 (one example of an auxiliary transmission) that changes the rate of rotation input from the input shaft 42 and transmits the resultant rotation to the rear-wheel side output shaft 44, and a front-wheel drive clutch 50 (one example of a clutch mechanism) that is a multiple disk clutch that adjusts the transfer torque transmitted from the rear-wheel side output shaft 44 to the driving side sprocket 46. The transfer 22 includes, inside the transfer case 40 and on a common axial center C2, a front-wheel side output shaft 52, and a driven side sprocket 54 integrally provided on the front-wheel side output shaft 52. The transfer 22 also includes, inside the transfer case 40, a front-wheel drive chain 56 that connects the driving side sprocket 46 and the driven side sprocket 54 together, and a differential locking mechanism 58 (one example of a dog clutch) that integrally connects (i.e., locks) the rear-wheel side output shaft 44 and the driving side sprocket 46 together.

The input shaft 42 is connected to an output rotating member, not shown, of the transmission 20, via a spline coupling or the like, and is rotatably driven by driving force transmitted from the engine 12 via the transmission 20. The rear-wheel side output shaft 44 is a main drive shaft that is connected to the rear propeller shaft 26. The driving side sprocket 46 is provided around the rear-wheel side output shaft 44 in a manner so as to be able to rotate relative to the rear-wheel side output shaft 44. The front-wheel side output shaft 52 is an auxiliary drive shaft that is connected to the front propeller shaft 24.

The transfer 22 structured in this way for example places the vehicle in the two-wheel-drive state by interrupting torque transmitted to the driving side sprocket 46 and transmitting the power transmitted from the transmission 20 to only the rear wheels 16, or places the vehicle in the four-wheel-drive state by transmitting power to the driving side sprocket 46 and distributing this power to the front wheels 14 and the rear wheels 16. Also, the transfer 22 for example establishes one of a high-speed side gear (a high-speed side speed) H and a low-speed side gear (a low-speed side speed) L, and transmits the rotation from the transmission 20 either as it is or at a reduced speed downstream.

The high-low switching mechanism 48 includes a single pinion planetary gear set 60 and a high-low sleeve 62. The planetary gear set 60 includes a sun gear S that is connected to the input shaft 42, in a manner non-rotatable around the axial center C1 with respect to the input shaft 42, a ring gear R that is arranged substantially concentric with the sun gear S and is connected, in a manner non-rotatable around the axial center C1, to the transfer case 40, and a carrier CA that rotatably supports a plurality of pinions P that are in mesh with the sun gear S and the ring gear R, in a manner that enables the pinions P to revolve around the sun gear S. Accordingly, the rotation speed of the sun gear S is the same as that of the input shaft 42, and the rotation speed of the carrier CA is slower than that of the input shaft 42. High-side gear teeth 64 are fixed on an inner peripheral surface of this sun gear S. Also, low-side gear teeth 66 of the same diameter as the high-side gear teeth 64 are fixed on the carrier CA. The high-side gear teeth 64 are spline teeth that output rotation at the same speed as the input shaft 42 and are involved with establishing the high-speed side gear H. The low-side gear teeth 66 are spline teeth that output rotation at a slower speed than the high-side gear teeth 64 and are involved with establishing the low-speed side gear L. The high-low sleeve 62 is spline engaged with the rear-wheel side output shaft 44 in a manner able to move relative to the rear-wheel side output shaft 44 in a direction parallel to the axial center C1. The high-low sleeve 62 has a fork connecting portion 62a, and outer peripheral teeth 62b that are integrally provided adjacent to the fork connecting portion 62a, and mesh with the high-side gear teeth 64 and the low-side gear teeth 66 by the high-low sleeve 62 moving in the direction parallel to the axial center C1 of the rear-wheel side output shaft 44. Rotation at the same speed as the rotation of the input shaft 42 is transmitted to the rear-wheel side output shaft 44 when the outer peripheral teeth 62b are in mesh with the high-side gear teeth 64, and rotation at a slower speed than the rotation of the input shaft 42 is transmitted to the rear-wheel side output shaft 44 when the outer peripheral teeth 62b are in mesh with the low-side gear teeth 66. The high-side gear teeth 64 and the high-low sleeve 62 function as a high-speed side gear clutch for establishing the high-speed side gear H, and the low-side gear teeth 66 and the high-low sleeve 62 function as a low-speed side gear clutch for establishing the low-speed side gear L. The high-low switching mechanism 48 is in a power transmission interrupted state (i.e., a neutral state) when the high-low sleeve 62 is not in mesh with either the high-side gear teeth 64 or the low-side gear teeth 66. The high-low switching mechanism 48 passes through this power transmission interrupted state when switching gears between the high-speed side gear H and the low-speed side gear L.

The differential locking mechanism 58 has locking teeth 68 fixed on an inner peripheral surface of the driving side sprocket 46, and a locking sleeve 70 that has, fixed to an outer peripheral surface thereof, outer peripheral teeth 70a that are spline-engaged with the rear-wheel side output shaft 44 so as to be able to move relative to the rear-wheel side output shaft 44 in a direction parallel to the axial center C1, and that mesh with the locking teeth 68 when the locking sleeve 70 moves in the direction parallel to the axial center C1. In the transfer 22, when the differential locking mechanism 58 is in an engaged state in which the outer peripheral teeth 70a of the locking sleeve 70 are in mesh with the locking teeth 68, the rear-wheel side output shaft 44 and the driving side sprocket 46 rotate together as a unit, such that a center differential locked state is established.

The high-low sleeve 62 is provided in a space on the driving side sprocket 46 side of a planetary gear set 60. The locking sleeve 70 is provided separately from and adjacent to the high-low sleeve 62, in the space between the high-low switching mechanism 48 and the driving side sprocket 46. The transfer 22 is provided with a first spring 72 between the high-low sleeve 62 and the locking sleeve 70. This first spring 72 is abutted against the high-low sleeve 62 and locking sleeve 70, and urges the high-low sleeve 62 and the locking sleeve 70 away from each other. The transfer 22 is also provided with a second spring 74 between the driving side sprocket 46 and the locking sleeve 70. This second spring 74 is abutted against a protruding portion 44a of the rear-wheel side output shaft 44 and the locking sleeve 70, and urges the locking sleeve 70 toward the side away from the locking teeth 68. The protruding portion 44a is a flange portion of the rear-wheel side output shaft 44 that is provided protruding on the locking teeth 68 side in a space on the radially inner side of the driving side sprocket 46. The high-side gear teeth 64 are provided in a position farther away from the locking sleeve 70 than the low-side gear teeth 66 when viewed in the direction parallel to the axial center C1. The outer peripheral teeth 62b of the high-low sleeve 62 mesh with the high-side gear teeth 64 on the side where the high-low sleeve 62 moves away from the locking sleeve 70 (i.e., on the left side in FIGS. 2 and 3), and mesh with the low-side gear teeth 66 on the side where the high-low sleeve 62 moves toward the locking sleeve 70 (i.e., on the right side in FIGS. 2 and 3). The outer peripheral teeth 70a of the locking sleeve 70 mesh with the locking teeth 68 on the side where the locking sleeve 70 moves toward the driving side sprocket 46 (i.e., on the right side in FIGS. 2 and 3). Therefore, the outer peripheral teeth 70a of the locking sleeve 70 mesh with the locking teeth 68 when the high-low sleeve 62 is in the position in which the outer peripheral teeth 62b of the high-low sleeve 62 are in mesh with the low-side gear teeth 66.

The front-wheel drive clutch 50 is a wet-type multiple disk friction clutch that includes a clutch hub 76 that is connected to the rear-wheel side output shaft 44 in a manner unable to rotate relative to the rear-wheel side output shaft 44, a clutch drum 78 that is connected to the driving side sprocket 46 in a manner unable to rotate relative to the driving side sprocket 46, a plurality of friction plates (i.e., friction engagement elements) 80 that are interposed between the clutch hub 76 and the clutch drum 78 and that selectively engage and disengage the clutch hub 76 and the clutch drum 78, and a piston 82 that presses on the friction plates 80. The front-wheel drive clutch 50 is arranged around the axial center C1 of the rear-wheel side output shaft 44, on the opposite side of the driving side sprocket 46 than the high-low switching mechanism 48. The friction plates 80 are pressed on by the piston 82 that moves toward the driving side sprocket 46 side. The front-wheel drive clutch 50 is placed in a released state when the piston 82 is moved toward the non-pressing side (i.e., the right side in FIGS. 2 and 3) that is the side away from the driving side sprocket 46 in a direction parallel to the axial center C1, and is not abutting against the friction plates 80. On the other hand, the front-wheel drive clutch 50 is placed in a slip state or an engaged state by the transfer torque (torque capacity) being adjusted by the amount of movement of the piston 82, when the piston 82 is moved toward the pressing side (i.e., the left side in FIGS. 2 and 3) that is the side closer to the driving side sprocket 46 in a direction parallel to the axial center C1, and is abutting against the friction plates 80.

Figure 3:
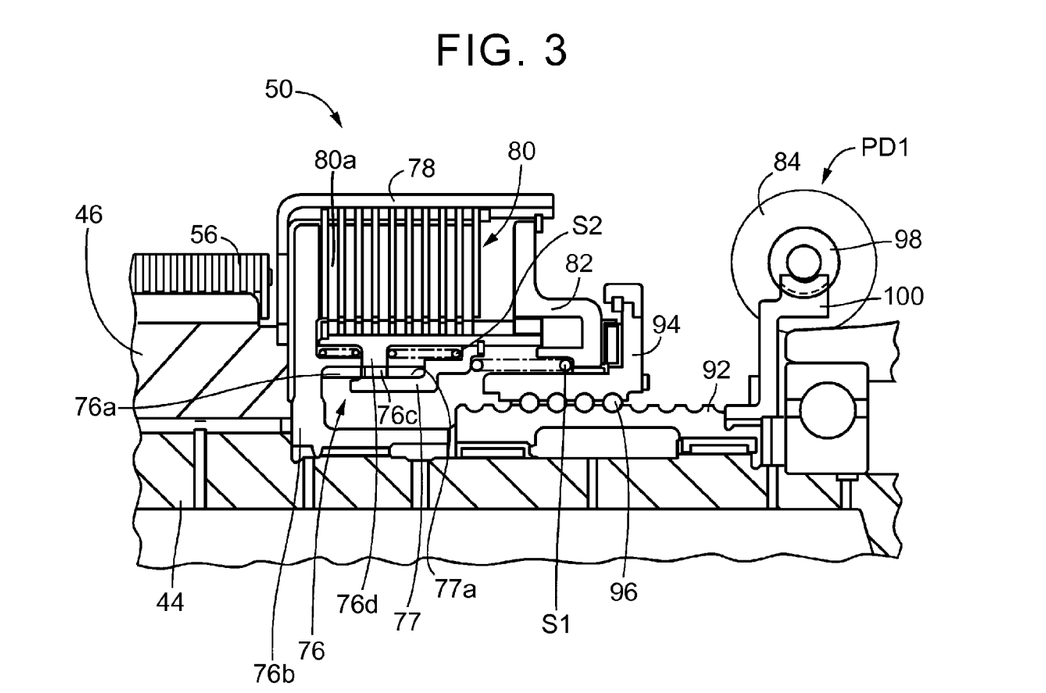
FIG. 3 is an enlarged view of the structure of the main portions of the clutch mechanism used to switch between a two-wheel-drive state and a four-wheel-drive state in the transfer shown in FIG. 2, and shows the clutch mechanism in a released state.

As shown in the enlarged view of FIG. 3 as well, the clutch hub 76 includes a clutch hub main body 76b and an inner hub 76d. The clutch hub main body 76b has inward pointing first spline teeth (first meshing teeth) 76a, and is connected to the rear-wheel side output shaft 44 in a manner non-rotatable relative to the rear-wheel side output shaft 44. The inner hub 76d has inward pointing second spline teeth (second meshing teeth) 76c that have the same diameter as the first spline teeth 76a, formed adjacent to the first spline teeth 76a in the rotational axis direction. Every other inner peripheral side friction plate 80a, from among the plurality of friction plates 80, has teeth on the inner peripheral side and is engaged with the inner hub 76d in a manner non-rotatable relative to the inner hub 76d. The inner hub 76d is provided in a non-rotatable manner with respect to the clutch hub main body 76b. Also, a sleeve 77 is provided that has outward pointing third spline teeth (third meshing teeth) 77a that are in constant mesh with the second spline teeth 76c. End portions of the third spline teeth 77a are provided so as to be able to move in the rotational axis direction of the rear-wheel side output shaft (the first rotating member) 44 to a position where they (i.e., the end portions of the third spline teeth 77a) mesh with the first spline teeth 76a, such that the distance between the piston 82 and the sleeve 77, which is moved by the piston, is able to change.

A fourth spring S1 is interposed in a pressure-applying state between the piston 82 and the sleeve 77, and a fifth spring S2 that has less urging force than the fourth spring S1 is interposed in a pressure-applying state between the sleeve 77 and the inner hub 76d. Therefore, when the front-wheel drive clutch 50 is placed in disengaged state in order to place the vehicle in a two-wheel-drive state, the inner hub 76d is positioned in a disengaged position on the piston 82 side, i.e., in a clutch released state, by the urging force of the fifth spring S2, and the piston 82 is positioned in a non-operating position by the urging force of the fourth spring S1. FIGS. 2 and 3 are views illustrating this state. In this state, the clutch hub main body 76b and the inner hub 76d rotate relative to one another, while the clutch drum 78 and the inner hub 76d do not rotate relative to each other and there is no drag between the friction plates 80 that relatively non-rotatably engage the clutch drum 78 and the inner hub 76d with each other alternately. Only a slight amount of drag is generated between the one friction plate 80 that is adjacent to the clutch hub main body 76b, from among the plurality of friction plates 80, and the clutch hub main body 76b, so drag torque of the front-wheel drive clutch 50 in the released state is able to be significantly reduced. As a result, when running in the two-wheel-drive state in which the front-side clutch 36 and the front-wheel drive clutch 50 are released, the front-wheel drive chain 56, the driven side sprocket 54, the front-wheel side output shaft 52, the front propeller shaft 24, and the front wheel differential gear unit 28 are all placed in non-rotating states by the driving side sprocket 46, so the front propeller shaft 24 is in a disconnected state, and consequently, the fuel efficiency of the vehicle when running in the two-wheel-drive state improves considerably.

When the front-wheel drive clutch 50 is in a released state and the differential locking mechanism 58 is in a released state in which the outer peripheral teeth 70a of the locking sleeve 70 are not in mesh with the locking teeth 68, a power transmitting path between the rear-wheel side output shaft 44 and the driving side sprocket 46 is interrupted, so the transfer 22 transmits the power transmitted to the transmission 20 only to the rear wheels 16. When the front-wheel drive clutch 50 is in the slip state or the engaged state, the transfer 22 distributes the power transmitted from the transmission 20 to both the front wheels 14 and the rear wheels 16. When the front-wheel drive clutch 50 is in the slip state, differential rotation is allowed between the rear-wheel side output shaft 44 and the driving side sprocket 46, such that a differential state (a center differential unlocked state) is established in the transfer 22. When the front-wheel drive clutch 50 is in the engaged state, the rear-wheel side output shaft 44 and the driving side sprocket 46 rotate together as a unit, such that the center differential locked state is established in the transfer 22. The front-wheel drive clutch 50 is able to continuously change the torque distribution between the front wheels 14 and the rear wheels 16 between 0:100 and 50:50, for example, by controlling the transfer torque.

The transfer 22 also includes, as an apparatus that operates the high-low switching mechanism 48, the front-wheel drive clutch 50, and the differential locking mechanism 58, a motor 84, a screw mechanism 86 that converts the rotational motion of the motor 84 into linear motion via a worm gear that is a reduction gear, and a transmitting mechanism 88 that transmits the linear motion force of the screw mechanism 86 to the high-low switching mechanism 48, the front-wheel drive clutch 50, and the differential locking mechanism 58. A piston driving device PD1 is formed by the motor 84, the worm gear 90, and the screw mechanism 86.

When placing the front-wheel drive clutch 50 in the engaged state in order to switch from the two-wheel-drive state to the four-wheel-drive state, the piston 82 moves forward toward the driving side sprocket 46 side against the urging force of the fourth spring S1 and the urging force of the fifth spring S2, by the motor 84, the worm gear 90, and the screw mechanism 86. In this process, the sleeve 77 also moves forward in conjunction with the piston 82 moving forward, such that the third spline teeth 77a of the sleeve 77 engage with the first spline teeth 76a of the clutch hub main body 76b. Further, the front-wheel drive clutch 50 is placed in an engaged state by the friction force of the friction plates 80, as a result of the piston 82 moving forward and pressing on the friction plates 80.

Figure 4:
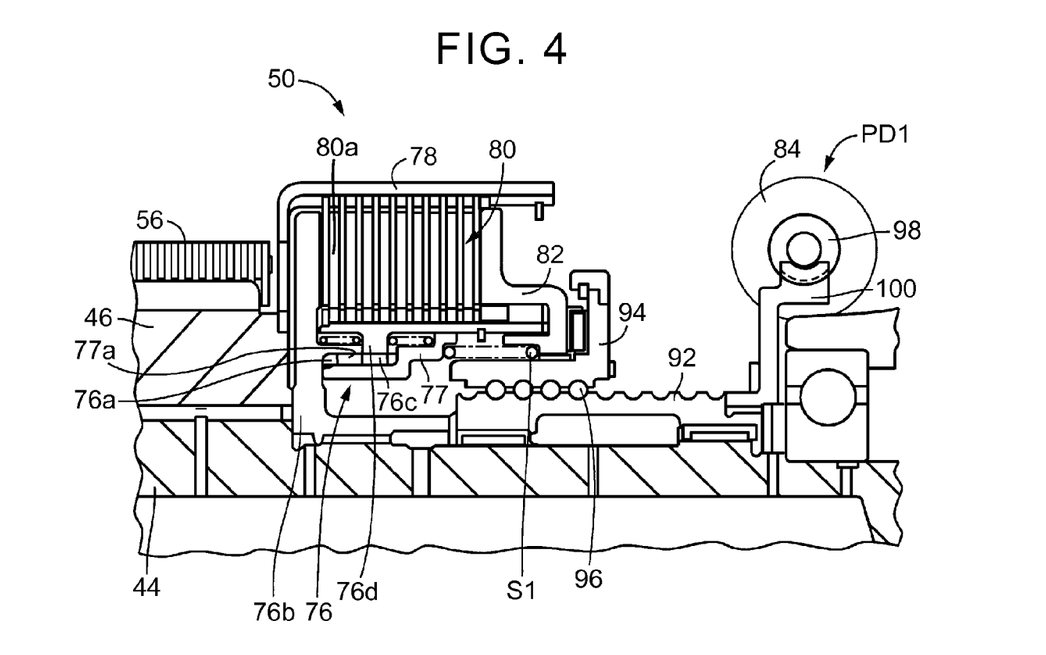
FIG. 4 is an enlarged view of the structure of the main portions of the clutch mechanism used to switch between the two-wheel-drive state and the four-wheel-drive state in the transfer shown in FIG. 2, and shows the clutch mechanism in an engaged state.

In this forward process of the piston 82, if the third spline teeth 77a of the sleeve 77 abut against the ends of the first spline teeth 76a of the clutch hub main body 76b when the phases of the first spline teeth 76a and the third spline teeth 77a do not match, the sleeve 77 is allowed to stop, even though the piston 82 is moving forward, due to compressive deformation of the fourth spring S1. Then after the phases of the third spline teeth 77a and the first spline teeth 76a match, the sleeve 77 is moved by the elastic restoring force of the fourth spring S1, such that the third spline teeth 77a and the first spline teeth 76a become engaged. In this state, power is transmitted by the transfer torque according to the pressure on the piston 82. FIG. 4 is a view showing this state.

The screw mechanism 86 is arranged around the same axial center C1 as the rear-wheel side output shaft 44, and includes a cylindrical threaded member 92 that is indirectly connected to the motor 84 via the worm gear 90 provided in the transfer 22, and a nut member 94 as a linear motion member that is connected to the threaded member 92 so as to be able to move in the direction parallel to the axial center C1 as the cylindrical threaded member 92 rotates. The screw mechanism 86 is a ball screw in which the threaded member 92 and the nut member 94 operate via multiple small-diameter balls 96. The worm gear 90 is a gear pair provided with a worm 98 integrally formed on a motor shaft of the motor 84, and a worm wheel 100 that is arranged around the axial center C1 and integrally formed on the cylindrical threaded member 92. For example, the rotation from the motor 84 that is a brushless motor is reduced in speed and transmitted to the cylindrical threaded member 92 via the worm gear 90. The screw mechanism 86 converts the rotation of the motor 84 transmitted to the cylindrical threaded member 92 into linear motion of the nut member 94.

The transmitting mechanism 88 includes a fork shaft 102 that is provided around a different axial center C3 that is parallel to the axial center C1 of the cylindrical threaded member 92 and is connected to the nut member 94, and a fork 104 that is fixed on the fork shaft 102 and is connected to the high-low sleeve 62. The transmitting mechanism 88 transmits the linear motion force of the nut member 94 of the screw mechanism 86 to the high-low sleeve 62 of the high-low switching mechanism 48 via the fork shaft 102 and the fork 104. Force is applied to both the high-low sleeve 62 and the locking sleeve 70 via the first spring 72, and the locking sleeve 70 receives force from the protruding portion 44a of the rear-wheel side output shaft 44 via the second spring 74. Accordingly, the transmitting mechanism 88 transmits the linear motion force of the nut member 94 of the screw mechanism 86 to the locking sleeve 70 of the differential locking mechanism 58 via the high-low sleeve 62. Therefore, the first spring 72 and the second spring 74 function as members that form a portion of the transmitting mechanism 88.

The screw mechanism 86 is arranged on the opposite side of the front-wheel drive clutch 50 than the driving side sprocket 46. The piston 82 of the front-wheel drive clutch 50 is connected to the nut member 94 of the screw mechanism 86 in a manner non-movable relative to the nut member 94 in the direction parallel to the axial center C1, and non-rotatable relative to the nut member 94 around the axial center C1. Accordingly, the linear motion force of the nut member 94 of the screw mechanism 86 is transmitted to the friction plates 80 of the front-wheel drive clutch 50 via the piston 82. Therefore, the piston 82 is a pressing member that is connected to the nut member 94 and presses on the friction plates 80 of the front-wheel drive clutch 50, and also functions as a member that forms a portion of the transmitting mechanism 88. In this way, the transmitting mechanism 88 transmits the linear motion force of the nut member 94 of the screw mechanism 86 to the friction plates 80 of the front-wheel drive clutch 50.

The transmitting mechanism 88 includes a connecting mechanism 106 that connects the nut member 94 to the fork shaft 102. The connecting mechanism 106 includes two flanged cylindrical members 108a and 108b, a cylindrical spacer 110, a third spring 112, a grasping member 114, and a connecting member 116. The two flanged cylindrical members 108a and 108b are arranged around the axial center C3 and are able to slide on the fork shaft 102 in a direction parallel to the axial center C3. The two flanged cylindrical members 108a and 108b are arranged such that a flange provided on one end portion of the flanged cylindrical member 108a faces a flange provided on one end portion of the flanged cylindrical member 108b. The spacer 110 is interposed between the two flanged cylindrical members 108a and 108b. The third spring 112 is arranged on the outer peripheral side of the spacer 110. The grasping member 114 grasps the two flanged cylindrical members 108a and 108b in a manner able to slide in a direction parallel to the axial center C3. The connecting member 116 connects the grasping member 114 to the nut member 94. The grasping member 114 slides the flanged cylindrical members 108a and 108b on the fork shaft 102 by abutting against the flanges of the flanged cylindrical members 108a and 108b. The length between the flanges when the flanges of the flanged cylindrical members 108a and 108b are abutted against the grasping member 114 is longer than the length of the spacer 110. Therefore, the state in which the flanges are abutted against the grasping member 114 is created by the urging force of the third spring 112.

The fork shaft 102 has stoppers 118a and 118b on an outer peripheral surface. These stoppers 118a and 118b stop the flanged cylindrical members 108a and 108b, respectively, from sliding in the direction parallel to the axial center C3. Stopping the flanged cylindrical members 108a and 108b from sliding with the stoppers 118a and 118b in this way enables the transmitting mechanism 88 to transmit the linear motion power of the nut member 94 to the high-low switching mechanism 48 via the fork shaft 102 and the fork 104.

The outer peripheral teeth 70a of the locking sleeve 70 mesh with the locking teeth 68 when the fork shaft 102 is in a position that places the outer peripheral teeth 62b of the high-low sleeve 62 in mesh with the low-side gear teeth 66 (this position will be referred to as a "low gear position"). The friction plates 80 of the front-wheel drive clutch 50 are pressed on by the piston 82 when the fork shaft 102 is in a position that places the outer peripheral teeth 62b of the high-low sleeve 62 in mesh with the high-side gear teeth 64 (this position will be referred to as a "high gear position"). The friction plates 80 of the front-wheel drive clutch 50 are not pressed on by the piston 82 when the fork shaft 102 is in the low gear position.

When the fork shaft 102 is in the high gear position, the length between the flanges of the flanged cylindrical members 108a and 108b is able to be changed between the length when the flanges are in a state abutted against the grasping member 114, and the length of the spacer 110. Therefore, the connecting mechanism 106 allows the nut member 94 to move in the direction parallel to the axial center C1, between a position in which the friction plates 80 of the front-wheel drive clutch 50 are pressed on by the piston 82 and a position in which the friction plates 80 of the front-wheel drive clutch 50 are not pressed on by the piston 82, while the fork shaft 102 remains in the high gear position.

The transfer 22 includes a gear position maintaining mechanism 120 that maintains the high gear position of the fork shaft 102, and maintains the low gear position of the fork shaft 102. The gear position maintaining mechanism 120 includes a housing hole 122, a locking ball 124, a locking spring 126, and recessed portions 128h and 128l. The housing hole 122 is formed in an inner peripheral surface of the transfer case 40 along which the fork shaft 102 slides. The locking ball 124 is housed in the housing hole 122. The locking spring 126 is housed in the housing hole 122 and urges the locking ball 124 toward the fork shaft 102 side. The recessed portions 128h and 128l are formed on an outer peripheral surface of the fork shaft 102. The recessed portion 128h receives a portion of the locking ball 124 when the fork shaft 102 is in the high gear position, and the recessed portion 128l receives a portion of the locking ball 124 when the fork shaft 102 is in the low gear position. By maintaining the gear position (either the high or the low gear position) of the fork shaft 102 with the gear position maintaining mechanism 120, the gear position of the fork shaft 102 is able to be maintained even if output from the motor 84 is stopped in that gear position.

The transfer 22 includes a low gear position detection switch 130 that detects the low gear position of the fork shaft 102. The low gear position detection switch 130 is a ball-type contact switch, for example. The low gear position detection switch 130 is fixed in a through hole 132 formed in the transfer case 40, at a position contacting the fork shaft 102 when the fork shaft 102 has moved to the low gear position. When the low gear position is detected by the low gear position detection switch 130, an indicator for notifying a driver that the center differential locked state is established in the low-speed side gear L, for example, is illuminated.

Returning now to FIG. 1, an electronic control unit (ECU) 200 that includes a control apparatus of the vehicle 10 that switches between 2WD and 4WD, for example, is provided in the vehicle 10. The ECU 200 includes a so-called microcomputer that includes, for example, a CPU, RAM, ROM, and an input/output interface and the like. The CPU executes various controls of the vehicle 10 by processing signals according to a program stored in the ROM in advance, while using the temporary storage function of the RAM. For example, the ECU 200 executes output control that controls the output of the engine 12, and switching control to switch the driving state of the vehicle 10, and the like, and is formed divided into sections for engine control and driving state control and the like as necessary. As shown in FIG. 1, various actual values based on detection signals from various sensors provided in the vehicle 10 are supplied to the ECU 200. Examples of such actual values include an engine speed Ne, a motor rotation angle θm, wheel speeds Nwfl, Nwfr, Nwrl, and Nwrr of the front wheels 14L and 14R and the rear wheels 16L and 16R, an accelerator operation amount θacc, an H-range request Hon that is a signal indicating that an H-range selector switch 210 has been operated, a 4WD request 4WDon that is a signal indicating that a 4WD selector switch 212 has been operated, and LOCKon that is a signal indicating that a differential lock selector switch 214 has been operated, and the like. Examples of the various sensors include an engine speed sensor 202, a motor rotation angle sensor 204, wheel speed sensors 206, an accelerator operation amount sensor 208, a H-range selector switch 210 for selecting the high-speed side gear H in response to an operation by the driver, a 4WD selector switch 212 for selecting 4WD in response to an operation by the driver, and a differential lock selector switch 214 for selecting the center differential locked state in response to an operation by the driver, and the like. An engine output control command signal Se for output control of the engine 12, an operation command signal Sd for switching the state of the front-side clutch 36, and a motor drive command signal Sm for controlling the rotation amount of the motor 84 and the like are output from the ECU 200 to an output control apparatus of the engine 12, an actuator of the front-side clutch 36, and the motor 84, and the like, respectively, as shown in FIG. 1.

In the vehicle 10 structured as described above, the amount of movement (i.e., the stroke) of the nut member 94 is controlled by controlling the rotation amount of the motor 84. When the fork shaft 102 is in the high gear position, the position in which the front-wheel drive clutch 50 is placed in the released state by driving the motor 84 a predetermined rotation amount to move the nut member 94 by a predetermined stroke amount toward the non-pressing side from a position in which the piston 82 is abutted against the friction plates 80, is a position (referred to as an "H2 position") that places the vehicle 10 in the 2WD running state in which only the rear wheels 16 are driven in the high-speed side gear H. When the front-side clutch 36 is placed in the released state in this H2 position, rotation is not transmitted from either the engine 12 side or the front wheel 14 side, to the rotating elements (e.g., the driving side sprocket 46, the front-wheel drive chain 56, the driven side sprocket 54, the front-wheel side output shaft 52, and the front propeller shaft 24) that form the power transmitting path from the driving side sprocket 46 to the front propeller shaft 24, when running in 2WD. Therefore, when running in 2WD, these rotating elements are stopped from rotating and are prevented from being dragged along, so running resistance is reduced.

Also, as shown in FIG. 2, for example, when the fork shaft 102 is in the high gear position, the position in which the front-wheel drive clutch 50 is placed in the slip state by controlling the rotation amount of the motor 84 to move the nut member 94 toward the pressing side from the position where the piston 82 abuts against the friction plates 80, is a position (referred to as an "H4 position") that places the vehicle 10 in the 4WD running state in which power is transmitted to both the front wheels 14 and the rear wheels 16 in the high-speed side gear H. In this H4 position, torque distribution between the front wheels 14 and the rear wheels 16 is adjusted as necessary by controlling the transfer torque of the front-wheel drive clutch 50.

Also, as shown in FIG. 2, for example, the position in which the front-wheel drive clutch 50 is placed in the engaged state by controlling the rotation amount of the motor 84 to move the nut member 94 farther to the pressing side from the H4 position, is a position (referred to as an "H4L position") for placing the vehicle 10 in the 4WD running state in the center differential locked state in the low-speed side gear L.

Also, when the fork shaft 102 is in the low gear position, the front-wheel drive clutch 50 is in the released state and the differential locking mechanism 58 is in the engaged state, as shown in FIG. 4, so this position is a position (referred to as an "L4 position") that places the vehicle 10 in the 4WD running state in the center differential locked state in the low-speed side gear L.

The switch between the high gear position and the low gear position of the fork shaft 102 is performed when the transmission 20 is in a neutral state while the vehicle 10 is stopped, for example. Therefore, in the differential locking mechanism 58, the high-low sleeve 62 is provided separately from the locking sleeve 70, so the high-low sleeve 62 is able to move even if the locking sleeve 70 is unable to when the fork shaft 102 switches from the high gear position to the low gear position due to the phases of the outer peripheral teeth 70a of the locking sleeve 70 and the locking teeth 68 not matching. Therefore, when the fork shaft 102 switches between the high gear position and the low gear position, the high-low sleeve 62 will not stop moving in a position that would place the high-low switching mechanism 48 in a neutral state, so power transfer to at least the rear wheel 16 side is able to be ensured.

As described above, with the front-wheel drive clutch (the clutch mechanism) 50 of this example embodiment, the clutch hub 76 includes the clutch hub main body 76b that is relatively non-rotatably connected to the rear-wheel side output shaft (i.e., the first rotating member) 44, and the inner hub 76d that is provided so as to be able to rotate relative to the clutch hub main body 76b, and is relatively non-rotatably engaged with the inner peripheral side of the friction engagement elements. In addition, the sleeve 77 is provided in a manner able to rotate with respect to the inner hub 76d and able to move relative to the inner hub 76d in the direction of the rotational axis C1 of the rear-wheel side output shaft (i.e., the first rotating member) 44. This sleeve 77 moves in conjunction with the piston 82 to a position where it engages with the clutch hub main body 76b in a manner non rotatable relative to the clutch hub main body 76b. As a result, when the piston 82 is not being operated, the clutch hub main body 76b of the clutch hub 76 rotates together with the rear-wheel side output shaft (i.e., the first rotating member) 44, and the inner hub 76d, the friction plates 80, the clutch drum 78, and the driving side sprocket (i.e., the second rotating member) 46 are in non-rotating states. The plurality of friction plates 80 at this time do not rotate relative to each other, so drag torque is considerably small. When the piston 82 moves forward, relative rotation of the plurality of friction plates 80 becomes smaller, but the sleeve 77 and the clutch hub main body 76b remain disengaged until the sleeve 77 is rotating at the same speed as the clutch hub main body 76b. Once the sleeve 77 reaches the speed at which it is rotating in synchronization with the clutch hub main body 76b, the sleeve 77 and the clutch hub main body 76b spline engage, thereby enabling power to be transmitted. Therefore, when the piston 82 is released, i.e., in a non-operating state, the drag torque becomes considerably small, and the adjusting function of the transfer torque and speed synchronization are able to be performed by the single piston driving device PD1, so the size of the front-wheel drive clutch (i.e., the clutch mechanism) 50 is able to be smaller.

Also, with the front-wheel drive clutch (clutch mechanism) 50 in this example embodiment, the first spline teeth 76a that are parallel to the rotational axis direction (i.e., the direction in which the axial center C1 extends; also referred to as the "rotational axis C1 direction") are formed pointing inward on the clutch hub main body 76b, the second spline teeth 76c that are adjacent to the first spline teeth 76a and have the same diameter as the first spline teeth 76a are formed pointing inward on the inner hub 76d, the third spline teeth 77a that engage with the second spline teeth 76c are formed pointing outward on the sleeve 77, and the end portions of the third spline teeth 77a are provided so as to be able to move between an engaged position in which they are in mesh with the first spline teeth 76a and a disengaged position in which they are separated from the first spline teeth 76a. As a result, the size of the front-wheel drive clutch (i.e., the clutch mechanism) 50 is able to be even smaller.

Also, with the front-wheel drive clutch (i.e., the clutch mechanism) 50 in this example embodiment, the fourth spring S1 (i.e., an elastic member) that allows the sleeve 77 to temporarily stop when the piston 82 is being moved toward the engaged position, is also provided interposed between the sleeve 77 and the piston 82. Therefore, if the mesh phases between the sleeve 77 and the first spline teeth 76a do not match, the sleeve 77 is allowed to temporarily stop by the deformation of the fourth spring S1 (i.e., the elastic member). Then when the mesh phases between the sleeve 77 and the first spline teeth 76a match, the sleeve 77 is able to be moved by the restoring force of the fourth spring S1. As a result, the problems of gear rattle and teeth breaking are able to be eliminated.

Also, with the front-wheel drive clutch (i.e., the clutch mechanism) 50 in this example embodiment, the piston driving device PD1 includes the cylindrical threaded member 92 that is relatively rotatably supported on the rear-wheel side output shaft 44 and has a thread groove formed on the outer peripheral surface, the nut member that screws on to the cylindrical threaded member 92 and applies thrust to the piston, and the motor (i.e., the electric motor) 84 that rotatably drives the cylindrical threaded member 92 via the worm gear (i.e., the reduction gear) 90. Therefore, engagement and disengagement of the front-wheel drive clutch (i.e., the clutch mechanism) 50 are able to be controlled by the motor (i.e., the electric motor) 84, so the piston driving device PD1 is able to be made smaller.

Also, with the front-wheel drive clutch (i.e., the clutch mechanism) 50 in this example embodiment, the worm gear (i.e., the reduction gear) 90 is formed by a worm reduction gear that has the worm wheel 100 that is concentrically fixed to the cylindrical threaded member 92, and the worm 98 that is in mesh with the outer peripheral teeth of the worm wheel 100 and is rotatably driven by the motor (i.e., the electric motor) 84. The reduction ratio of this worm reduction gear is large, so a brake mechanism for keeping the motor 84 stopped is not necessary.

Next, other example embodiment of the invention will be described. In the description below, portions common to the example embodiment described above will be denoted by like reference characters and descriptions of those portions will be omitted.

Figure 5:
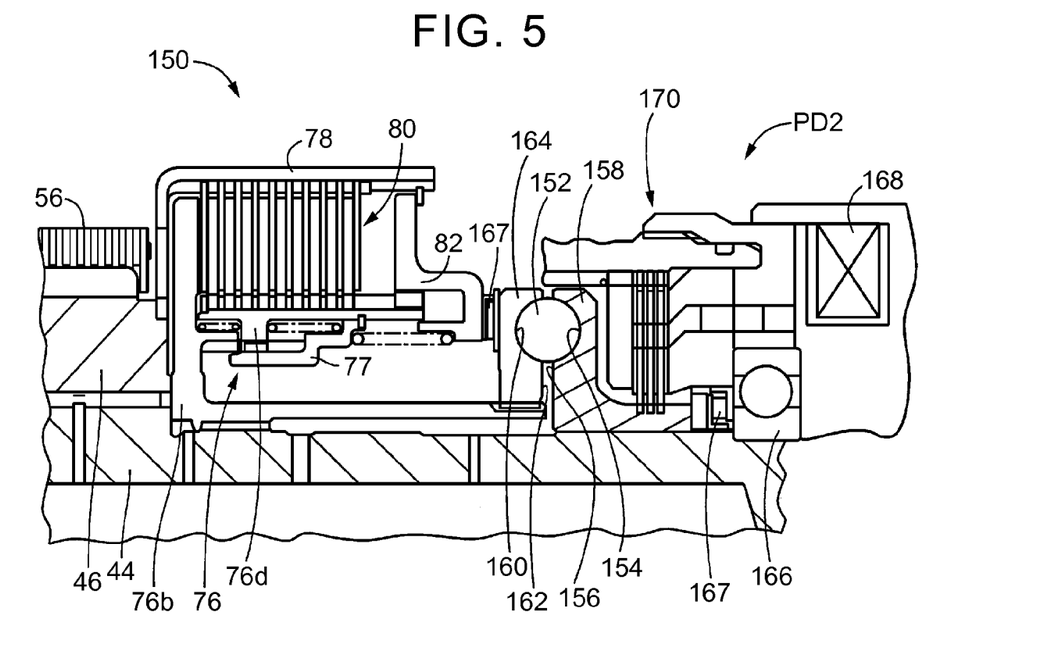
FIG. 5 is an enlarged view of the structure of the main portions of a clutch mechanism that includes a piston driving device that uses a ball cam, according to another example embodiment of the invention, and shows the clutch mechanism in a released state.

FIG. 5 is an enlarged view of the structure of the main portions of a front-wheel drive clutch mechanism 150 that includes a piston driving device PD2 that uses a ball cam, according to another example embodiment of the invention, which corresponds to FIG. 3. The front-wheel drive clutch mechanism 150 is the same as the front-wheel drive clutch mechanism 50 except for the piston driving device PD2.

As shown in FIG. 5, in the piston driving device PD2, a ball 152 that is a steel ball, for example, a first cam plate 158 that has a first cam groove 154 into which fits a portion of the ball 152 formed in a surface 156 facing the ball 152, and is relatively rotatably supported by the rear-wheel side output shaft (i.e., the first rotating member) 44, and a second cam plate 164 that has a second cam groove 160 into which fits another portion of the ball 152 formed in a surface 162 facing the ball 152, and is directly or indirectly supported, in a relatively non-rotatable manner, by the rear-wheel side output shaft (i.e., the first rotating member) 44, are interposed via a thrust bearing 167 between the piston 82 and a stopper member 166 provided on the rear-wheel side output shaft 44, in a state sandwiching the ball 152. In this example embodiment, an inner race of a bearing fit on the rear-wheel side output shaft 44 functions as the stopper member 166. Also, a wet-type multiple disc electromagnetic friction brake 170 that generates friction torque by the excitation of an electromagnetic coil 168 fixed to the transfer case 40 is provided between the first cam plate 158 and a non-rotating member, e.g., the transfer case 40. At least one of the first cam groove 154 and the second cam groove 160 is formed such that the groove depth becomes shallower in the peripheral direction. When braking torque is applied to the first cam plate 158 by the electromagnetic friction brake 170, the relative phase angle between the first cam plate 158 and the second cam plate 164 that rotates together with the rear-wheel side output shaft 44 changes and the distance between the first cam plate 158 and the second cam plate 164 increases, such that thrust is applied to the piston 82. With this example embodiment, the rotary force of the rear-wheel side output shaft (i.e., the first rotating member) 44 is converted to the rotational axis C1 direction, and is amplified by a ball cam mechanism, and thrust is applied to a hydraulic chamber 182. As a result, large thrust of the piston 82 is able to be obtained with relatively little energy for exciting the electromagnetic coil 168 of the electromagnetic friction brake 170.

Figure 6:
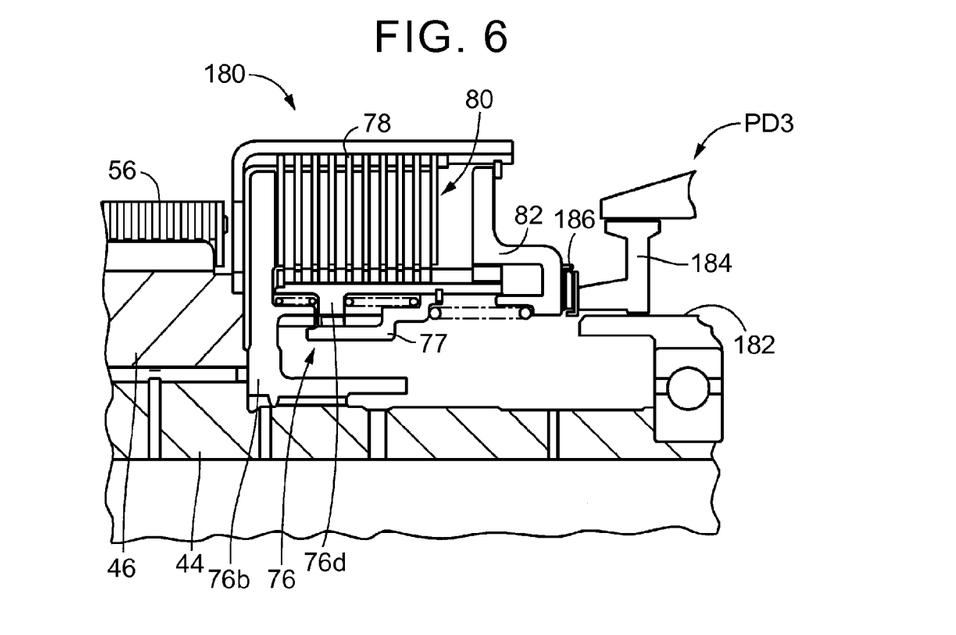
FIG. 6 is an enlarged view of the structure of the main portions of a clutch mechanism that includes a piston driving device that uses a hydraulic cylinder, according to yet another example embodiment of the invention, and shows the clutch mechanism in a released state.

FIG. 6 is an enlarged view of the structure of the main portions of a front-wheel drive clutch mechanism 180 that includes a piston driving device PD3 that uses a hydraulic cylinder, according to yet another example embodiment of the invention, which corresponds to FIG. 3. The front-wheel drive clutch mechanism 180 is the same as the front-wheel drive clutch mechanism 50 except for the piston driving device PD3.

As shown in FIG. 6, the piston driving device PD3 includes a hydraulic chamber 182 that is formed in the transfer case 40 and is open on the piston 82 side, and a hydraulic piston 184 is able to be manually fitted from the opening of the hydraulic chamber 182 and is pushed out by hydraulic pressure inside the hydraulic chamber 182. The piston driving device PD3 is configured such that the hydraulic piston 184 pushes on the hydraulic chamber 182 via a thrust bearing 186. According to this example embodiment, in a vehicle provided with a hydraulic pump and a valve body within which a hydraulic circuit is formed, relatively large thrust is able to be obtained by supplying hydraulic fluid to the hydraulic chamber using the hydraulic pump and valve body.

Heretofore, an example embodiment of the invention has been described in detail with reference to the drawings, but the invention may also be applied in other forms.

For example, the clutch mechanism of the invention is used as the front-wheel drive clutch mechanism 50, 150, and 180 of an FR-based four-wheel-drive vehicle described above, but the clutch mechanism may also be applied to another portion, such as a transfer of an FF-based four-wheel-drive vehicle, or a portion between the transfer and a rear wheel differential gear or the like. Further, the clutch mechanism of the invention is not limited to a constituent unit of a four-wheel-drive vehicle, and may also be applied to a clutch of another unit or the like.

Also, in the example embodiment described above, the fourth spring S1 and the fifth spring S2 are formed by coil springs, but they may also be formed by wave springs or diaphragm springs, and need only be elastic members made of synthetic rubber to the like that are able to elastically deform.

Also, in the example embodiment described above, the fourth spring S1 and the fifth spring S2 are used, but the fifth spring S2 does not necessarily have to be provided if both ends of the fourth spring S1 that is provided between the sleeve 77 and the piston 82 are hooked on the sleeve 77 and the piston 82.

Further, in the example embodiment described above, the fourth spring S1 is interposed between the sleeve 77 and the piston 82, but the fourth spring S1 may also be provided between the sleeve 77 or a member that moves together with the sleeve 77, and the piston 82 or a member that moves together with the piston 82, such as the nut member 94. Claim 3 describes just such a mode.

Also, in the example embodiment described above, a ball screw is given as an example of the screw mechanism 86, but the screw mechanism 86 is not limited to this. For example, the screw mechanism 86 need only be a conversion mechanism that converts the rotational motion of the motor 84 into linear motion, and may also be a mechanism in which a shaft of a simple bolt is combined with a nut, for example. More specifically, the screw mechanism 86 may be a slip screw or the like. When the screw mechanism 86 is a slip screw, the mechanical efficiency with which rotational motion is converted into linear motion is lower than it is with a ball screw, but certain effects, such as that high thrust is able to be applied to the front-wheel drive clutch 50, and the stroke necessary to operate the high-low switching mechanism 48 is able to be obtained, are able to be obtained.

Also, in the example embodiment described above, the screw mechanism 86 is indirectly connected to the motor 84 via the worm gear 90, but the screw mechanism 86 is not limited to this. For example, the cylindrical threaded member 92 of the screw mechanism 86 and the motor 84 may be directly connected without using the worm gear 90. More specifically, the cylindrical threaded member 92 and the motor 84 may be directly connected such that a pinion provided on the motor shaft of the motor 84 is in mesh with gear teeth formed on the cylindrical threaded member 92 at a predetermined reduction ratio.

Also, in the example embodiment described above, an internal combustion engine such as a gasoline engine or a diesel engine, for example, may be used as the engine 12 that given as an example of the driving force source. Also, another prime mover such as an electric motor, for example, may be used either alone or in combination with the engine 12, as the driving force source. Further, the transmission 20 is any one of a variety of automatic transmissions such as a planetary gear type stepped transmission, a continuously variable transmission (CVT), or a synchronous mesh twin shaft parallel axis-type automatic transmission (including a known DCT), or a known manual transmission. Also, the front-side clutch 36 is described as being an electromagnetic dog clutch, but the front-side clutch 36 is not limited to this. For example, the front-side clutch 36 may also be a type of friction clutch or a dog clutch that is provided with a shift fork that moves the sleeve in the axial direction, in which the shift fork is driven by an electrically controllable or hydraulically controllable actuator, or the like.

The example embodiments described above are no more than example embodiments. That is, the invention may be carried out in modes that have been modified or improved in any of a variety of ways based on the knowledge of one skilled in the art.

What is claimed is:

1. A clutch mechanism for a vehicle, the clutch mechanism comprising:
   a first rotating member having a shaft shape;
   a second rotating member supported by the first rotating member such that the second rotating member rotates relative to the first rotating member;
   a clutch hub connected to the first rotating member such that the clutch hub does not rotate relative to the first rotating member;
   a clutch drum connected to the second rotating member;
   a plurality of friction engagement elements configured to alternately engage with the clutch hub and the clutch drum, the plurality of friction engagement elements being configured to engage with the clutch hub such that the plurality of friction engagement elements do not rotate relative to the clutch hub when the plurality of friction engagement elements engages with the clutch hub, the plurality of friction engagement elements being configured to engage with the clutch drum such that the plurality of friction engagement elements do not rotate relative to the clutch drum when the plurality of friction engagement elements engages with the clutch drum,
   the plurality of friction engagement elements being overlapped with each other and configured to frictionally engage together;
   a piston configured to press on the plurality of friction engagement elements;
   a piston driving device configured to drive the piston, the piston driving device being configured to press the piston against the plurality of friction engagement elements such that the first rotating element and the second rotating element become selectively connected together by friction between the plurality of friction engagement elements,
   the clutch hub including a clutch hub main body and an inner hub, the clutch hub main body being connected to the first rotating member such that the clutch hub main body does not rotate relative to the first rotating member, the inner hub being configured to rotate relative to the clutch hub main body, the inner hub engaging with an inner peripheral side of the friction engagement elements such that the inner hub does not rotate relative to the friction engagement elements; and
   a sleeve configured to not rotate relative to the inner hub, and the sleeve being configured to move relative to the first rotating member in a rotational axis direction of the first rotating member, the sleeve being configured to move in conjunction with the piston to a position where the sleeve engages with the clutch hub main body and does not rotate relative to the clutch hub main body.

2. The clutch mechanism according to claim 1, further comprising:
   first spline teeth that are parallel to the rotational axis direction, the first spline teeth provided pointing inward on the clutch hub main body;
   second spline teeth that are adjacent to the first spline teeth, the second spline teeth having the same diameter as the first spline teeth, the second spline teeth being provided pointing inward on the inner hub; and
   third spline teeth that engage with the second spline teeth, the third spline teeth being provided pointing outward on the sleeve, wherein end portions of the third spline teeth move between an engaged position in which the end portions of the third spline teeth are in mesh with the first spline teeth and a disengaged position in which the end portions of the third spline teeth are separated from the first spline teeth.

3. The clutch mechanism according to claim 2, further comprising:
an elastic member interposed between the sleeve and the piston, the elastic member being configured to temporarily stop the sleeve when the piston is moved toward the engaged position.

4. The clutch mechanism according to claim 1, wherein the piston driving device includes a threaded member, a nut member, and an electric motor;
the threaded member is supported by the first rotating member, the threaded member and the first rotating member are configured to rotate relative to one another, and a thread groove is provided on an outer peripheral surface of the threaded member;
the nut member is screwed onto the threaded member, and the nut member applies thrust to the piston; and
the electric motor is configured to rotatably drive the threaded member via a reduction gear.

5. The clutch mechanism according to claim 4, wherein the reduction gear includes a worm wheel and a worm reduction gear,
the worm wheel is concentrically fixed to the threaded member,
the worm reduction gear meshes with outer peripheral teeth of the worm wheel, and
the worm reduction gear is rotatably driven by the electric motor.

6. The clutch mechanism according to claim 1, further comprising an electromagnetic friction brake, wherein
the piston driving device includes a first cam plate, a second cam plate, and a stopper,
the first cam plate is supported by the first rotating member such that the first cam plate rotates relative to the first rotating member,
the first cam plate includes a first surface, the first surface has a first cam groove into which a portion of a ball fits,
the second cam plate is supported by the first rotating member such that the second cam plate does not rotate relative to the first rotating member,
the second cam plate includes a second surface, the second surface has a second cam groove into which another portion of the ball fits,
the first cam plate and the second cam plate are interposed between the piston and the stopper while sandwiching the ball, and
the electromagnetic friction brake is provided between the first cam plate and a non-rotating member, and a distance between the first cam plate and the second cam plate increases such that thrust is applied to the piston, when braking torque by the friction brake is applied to the first cam plate.

7. The clutch mechanism according to claim 1, wherein the piston driving device includes a hydraulic chamber and a hydraulic cylinder;
the hydraulic cylinder is fitted into an opening in the hydraulic chamber such that the hydraulic cylinder slides against an inner peripheral wall of the opening, and the hydraulic cylinder includes a hydraulic piston that is pushed out by hydraulic pressure inside the hydraulic chamber.

* * * * *